United States Patent
Baker et al.

(10) Patent No.: US 6,877,698 B2
(45) Date of Patent: Apr. 12, 2005

(54) AIRCRAFT EVACUATION SLIDE INFLATION SYSTEM USING A STORED LIQUIFIED GAS CAPABLE OF THERMAL DECOMPOSITION

(75) Inventors: James J. Baker, Waldorf, MD (US); Jim Eskildsen, Tempe, AZ (US)

(73) Assignee: Universal Propulsion Company, Inc., Phoenix, AZ (US)

( * ) Notice: Subject to any disclaimer, the term of this patent is extended or adjusted under 35 U.S.C. 154(b) by 0 days.

(21) Appl. No.: 10/778,287

(22) Filed: Feb. 11, 2004

(65) Prior Publication Data

US 2004/0195457 A1 Oct. 7, 2004

Related U.S. Application Data

(63) Continuation-in-part of application No. 10/194,026, filed on Jul. 12, 2002.
(60) Provisional application No. 60/446,705, filed on Feb. 11, 2003.

(51) Int. Cl.$^7$ .............................................. B64D 25/00
(52) U.S. Cl. ........................ 244/905; 244/137.2; 182/48
(58) Field of Search ............................. 244/137.2, 136, 244/137.1, 905; 182/48

(56) References Cited

U.S. PATENT DOCUMENTS

| | | | | |
|---|---|---|---|---|
| 3,910,532 A | * | 10/1975 | Fischer | 244/137.2 |
| 4,368,009 A | * | 1/1983 | Heimovics et al. | 417/191 |
| 4,717,096 A | * | 1/1988 | Labarre et al. | 244/137.2 |
| 5,465,795 A | * | 11/1995 | Galbraith et al. | 169/11 |
| 6,581,878 B1 | * | 6/2003 | Bennett | 244/136 |
| 6,695,096 B2 | * | 2/2004 | Idler et al. | 182/48 |
| 6,769,647 B2 | * | 8/2004 | Moro et al. | 244/137.2 |
| 6,799,741 B2 | * | 10/2004 | Danielson et al. | 244/137.2 |
| 2003/0234323 A1 | * | 12/2003 | Danielson et al. | 244/137.2 |
| 2004/0094671 A1 | * | 5/2004 | Moro et al. | 244/137.2 |
| 2004/0118979 A1 | * | 6/2004 | Moro et al. | 244/137.2 |

* cited by examiner

*Primary Examiner*—Teri Pham Luu
*Assistant Examiner*—Stephen Holzen
(74) *Attorney, Agent, or Firm*—Jerry Holden; John D. Titus

(57) ABSTRACT

A system for deploying an aircraft emergency evacuation slide or other inflatable device utilizes an inflation gas that is stored in a partially liquified state. The inflation gas includes a gaseous compound, preferably nitrous oxide, that is capable of undergoing an exothermic thermal decomposition, which gives off heat and produces a greater number moles of inflation gas than the number of moles of gas stored. The increase in moles of gas allows a greater inflation volume for a given weight of stored gas, while the exothermic decomposition produces additional heat that offsets, to some extent, the endothermic boiling and expansion of the liquified stored gas.

18 Claims, 2 Drawing Sheets

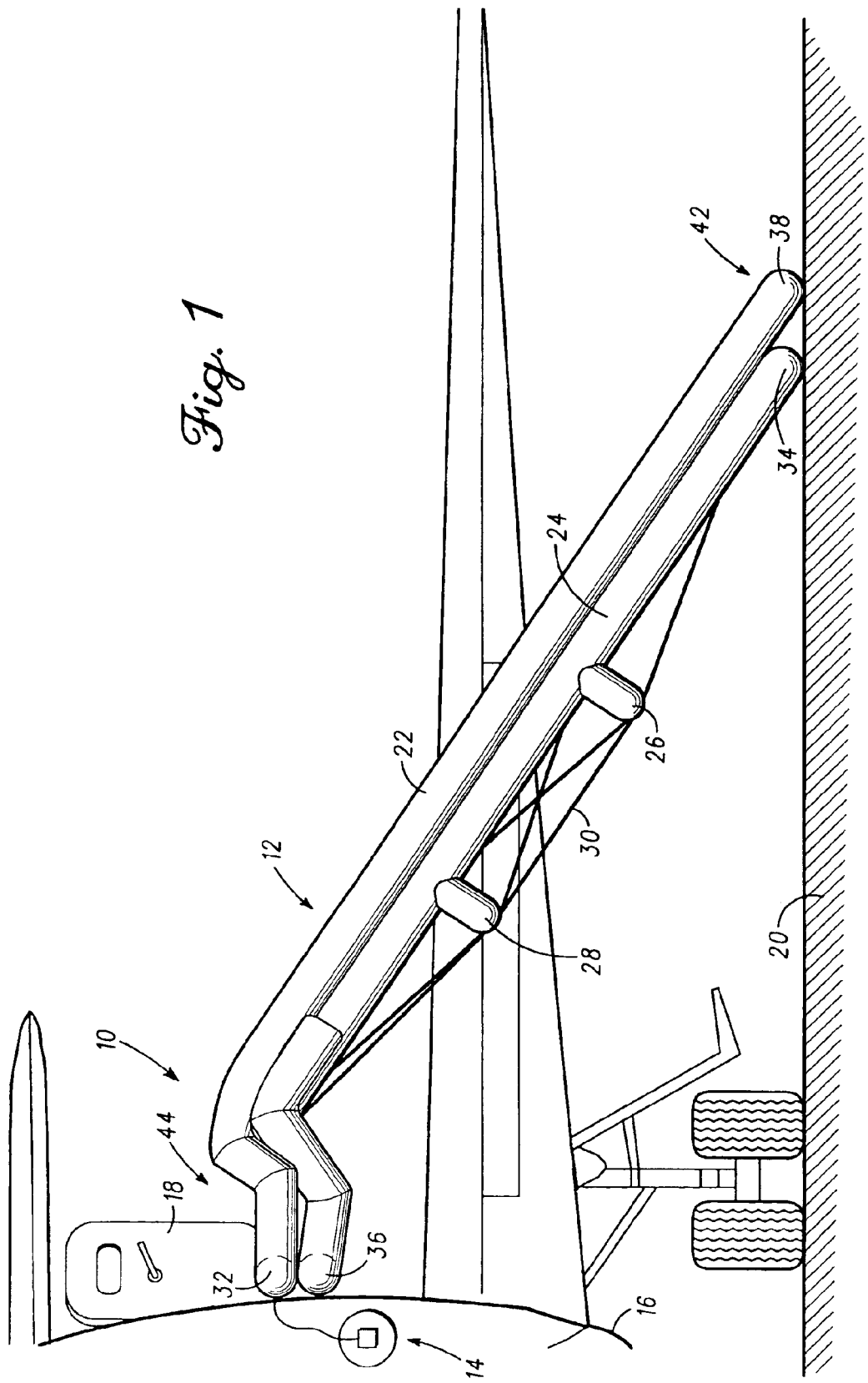

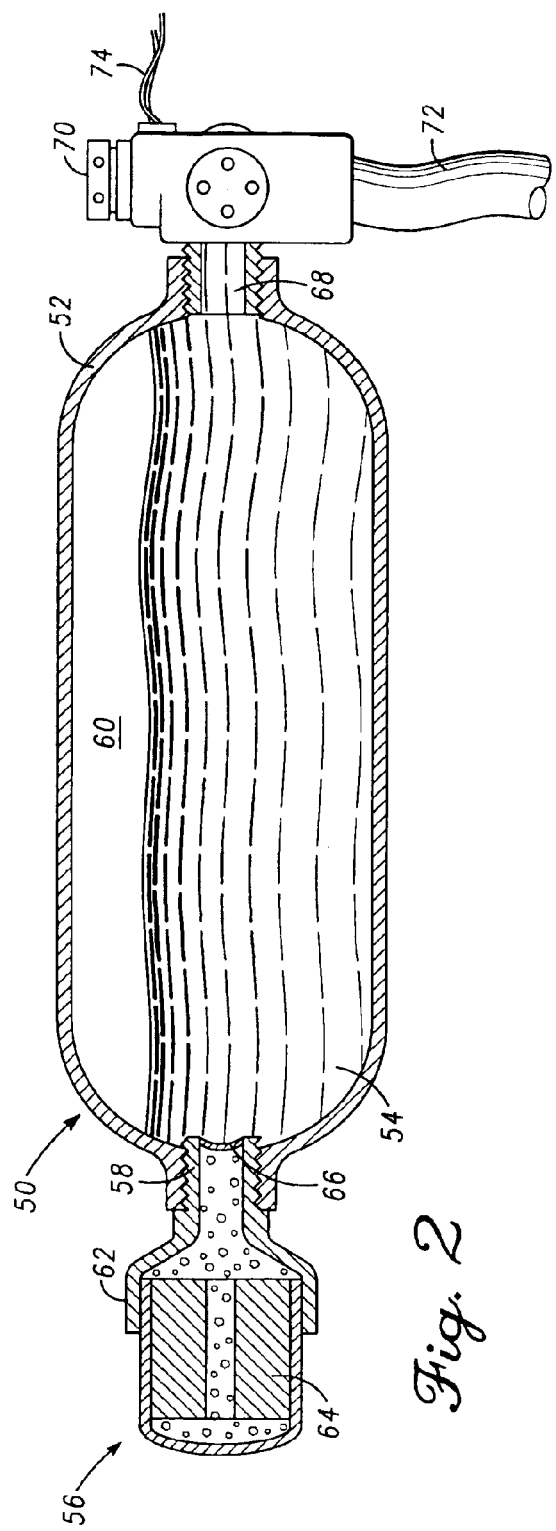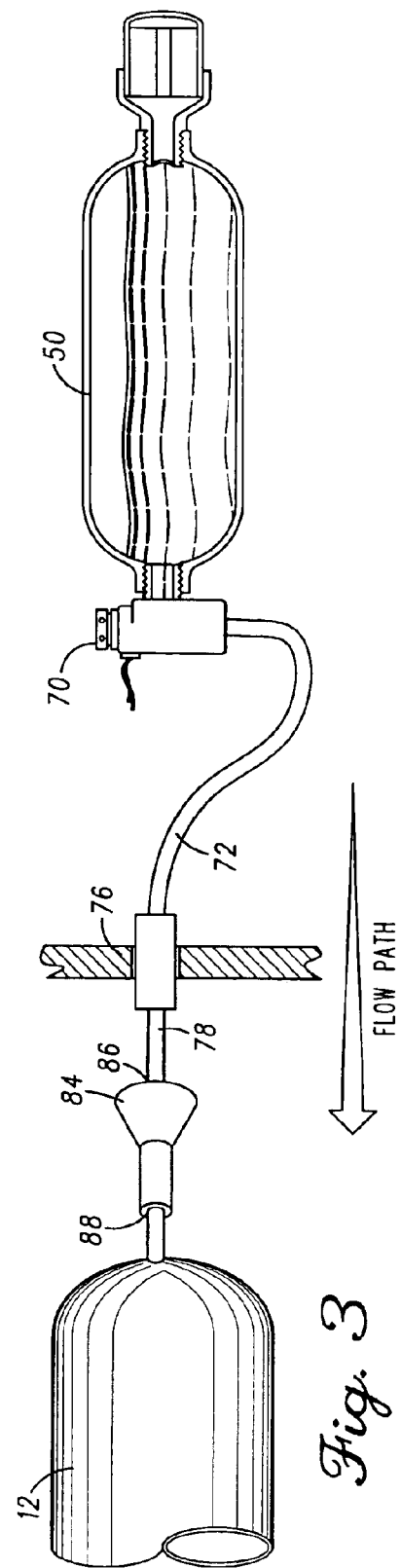

AIRCRAFT EVACUATION SLIDE INFLATION SYSTEM USING A STORED LIQUIFIED GAS CAPABLE OF THERMAL DECOMPOSITION

CROSS REFERENCE TO RELATED APPLICATIONS

This invention is a continuation-in-part application of co-pending U.S. patent application Ser. No. 10/194,026 filed on Jul. 12, 2002 and claims priority of U.S. Provisional Application No. 60/446,705 filed on Feb. 11, 2003.

BACKGROUND OF THE INVENTION

This invention relates to emergency evacuation equipment for aircraft. In particular, this invention relates to a system for deploying an inflatable aircraft emergency evacuation slide or slide/raft combination.

The requirement for reliably evacuating airline passengers in the event of an emergency is well known. Emergencies at take-off and landing often demand swift removal of the passengers from the aircraft because of the potential from injuries from fire, explosion, or sinking in water. A conventional method of quickly evacuating a large number of passengers from an aircraft is to provide multiple emergency exits, each of which is equipped with an inflatable evacuation slide. Current state-of-the-art emergency evacuation slide systems comprise an inflatable evacuation slide that is stored in an uninflated, folded state together with a source of inflation gas. The source of inflation gas typically comprises a gas generator, stored compressed gas, or a combination thereof. Compressed stored gas inflators typically require the storage of a relatively large volume of gas at a relatively high pressure. As a result of high gas storage pressures, the walls of the storage vessel must be relatively thick for increased strength. The combination of large volume and thick walls results in relatively heavy and bulky inflator designs. Additionally, where only a compressed gas is used to inflate the evacuation slide, a large drop in temperature occurs as the compressed gas expands, often causing ice to form, which can block the flow of gas. Pyrotechnic gas generators have an advantage in that they are small, lightweight, and produce a high volume of gas. The high temperature gas produced by a gas generator alone, however, causes numerous problems including sagging of the evacuation slide as the inflation gas cools and, in some cases, melting or scorching of the fabric out of which the inflation slide is fabricated. Because of the disadvantages associated with pure stored gas and pure pyrotechnic inflation devices, current state of the art emergency evacuation slide systems typically comprise a hybrid inflator, which utilizes a stored compressed gas together with a pyrotechnic gas generator. The pyrotechnic gas generator augments the stored compressed gas by providing additional gas as well as heat to counteract the effects of the expansion-induced cooling of the compressed gas as it expands out of the pressure vessel. Despite these advances, conventional hybrid evacuation slide inflators are still heavy and bulky. On one modem commercial aircraft, the weight of the pressure vessel alone is almost 35 pounds and weight of the gas charge over 16 pounds. Accordingly, the need still exists to further reduce the size and weight of emergency evacuation slide inflators and thereby improve the payload volume, weight, and fuel economy of the aircraft on which they are mounted.

SUMMARY OF THE INVENTION

The present invention comprises a system for deploying an aircraft emergency evacuation slide or other inflatable device wherein the inflator contains an inflation gas that is stored in a partially liquified state. The inflation gas includes a gaseous compound that is capable of undergoing thermal decomposition such that the number moles of gas produced by the inflator is greater than the number of moles of gas stored. According to one embodiment of the present invention, this is accomplished by selecting the stored inflation gas to be one of a family of gases capable of undergoing an exothermic thermal decomposition. As used herein, a gas capable of undergoing an exothermic decomposition reaction refers to a gas the molecules of which may be disassociated from a single molecular species into two or more molecular species. "Exothermic thermal decomposition" is a decomposition reaction that is initiated and sustained by subjecting the gas to an elevated temperature and which produces heat.

In an illustrative embodiment, two moles of nitrous oxide are decomposed to form two moles of diatomic nitrogen and a mole of diatomic oxygen. Because the universal gas constant is the same for all gases, the three moles of nitrogen and oxygen produced by the decomposition of two moles of nitrous oxide occupy 50% more volume than the two moles of nitrous oxide would have occupied at the same temperature and pressure. Therefore, by decomposing the stored nitrous oxide, the illustrative evacuation slide inflator is capable of inflating an aircraft evacuation slide that 50% larger than would be possible using undecomposed nitrous oxide. Since nitrous oxide has the same molecular weight as carbon dioxide (the most commonly used aircraft evacuation slide inflation gas), all else being equal, an aircraft evacuation slide inflator utilizing decomposing nitrous oxide will result in a weight savings of at least ⅓ as compared with the weight of the inflation gas of a conventional carbon dioxide hybrid inflator. Moreover, the exothermic decomposition of the nitrous oxide produces additional heat that offsets, to some extent, the endothermic boiling and expansion of the liquified stored gas.

BRIEF DESCRIPTION OF THE DRAWING

The present invention will be better understood from a reading of the following detailed description taken in conjunction with the accompanying drawing figures in which like references designate like elements and, in which:

FIG. 1 is a side view of an emergency evacuation slide incorporating features of the present invention;

FIG. 2 is a partial cross-sectional view of an inflator incorporating features of the present invention; and FIG. 3 is a gas flow schematic of an evacuation slide deployment system incorporating features of the present invention.

DETAILED DESCRIPTION

The drawing figures are intended to illustrate the general manner of construction and are not necessary to scale. In the detailed description and in the figures, specific illustrative examples are shown and herein described in detail. It should be understood, however, that the drawing, the figures, and detailed description are not intended to limit the invention to the particular form disclosed, but are merely illustrative and intended to teach one of ordinary skill how to make and/or use the invention claimed herein and for setting forth the best mode for carrying out the invention.

FIG. 1 shows a system 10 for deployment of an emergency evacuation slide incorporating features of the present invention. System 10 includes an inflatable evacuation slide 12 and an inflator 14 discussed more fully hereinafter. System 10 is stored with evacuation slide 12 in an undeployed condition in a packboard housing inside the fuselage of aircraft 16, in a packboard shell mounted to the fuselage of the aircraft (not shown) or in other locations on the aircraft. In a deployed condition, inflatable evacuation slide 12 extends from an elevated location proximal the exit opening 18 of aircraft 16 toward the ground level 20 or other lower supporting surface.

Inflatable evacuation slide 12 comprises an upper main support tube 22 and lower main support tube 24 supporting a flexible sliding surface (not shown). Upper main support tube 22 is maintained in a spaced-apart configuration relative to a second upper main support tube (not shown) by an upper toe end transverse tube 38 located at the foot end 42 of inflatable evacuation slide 12 and an upper head end transverse tube 32 located at head end 44 of inflatable evacuation slide 12. Lower main support tube 24 is similarly maintained in spaced-apart configuration by lower toe end transverse tube 34 at foot end 42 of inflatable evacuation slide 12 and lower head end transverse tube 36 located at head end 44 of inflatable evacuation slide 12. Additional support to prevent inflatable evacuation slide from buckling under heavy load is provided by a lower truss tube 26 and an upper truss tube 28 each of which comprises a U-shaped tube extending from lower main support tube 24. A plurality of truss straps 30 act as tension members to support inflatable evacuation slide 12 against buckling under heavy load.

FIG. 2 is a cross sectional view of an aircraft emergency evacuation slide inflator 50 incorporating features of the present invention. As will be described in greater detail below, the inflator 50 generates an inflation gas in part by decomposing a gas compound into at least two inflation gas species. The inflator 50 comprises a pressure vessel 52 containing a source gas mixture 54 that includes at least one gas source material that is capable of undergoing a thermal decomposition to form decomposition species used to inflate an associated aircraft evacuation slide or other inflatable device. A wide variety of gas source materials that undergo decomposition to form gaseous products are available. Such gas source materials include peroxide and peroxide derivatives such as methyl hyperoxide, and mixtures of methyl hyperoxide and methanol, hydrogen peroxide, alkyl hydroperoxides, propionyl and butyryl peroxide as well as mixtures thereof and nitrous oxide, ($N_2O$). Preferably the decomposable gas source material is nontoxic and non-corrosive in both the pre and post decomposition states; is relatively stable at ambient temperatures thus permitting and facilitating storage in a compressed gas or liquid phase; and liquefies at a relatively modest pressure at ambient temperatures.

In view of the manufacturability, storage and handling concerns, the preferred decomposable gas source material for use in practice of the present invention is nitrous oxide. In accordance with the chemical reaction (1) identified below, upon the decomposition of nitrous oxide, the decomposition products from two mole of nitrous oxide ($N_2O$) are two moles of diatomic nitrogen ($N_2$) and one mole of diatomic oxygen ($O_2$);

$$2N_2O = 2N_2 + O_2 \quad (1)$$

Nitrous oxide, although classified as an oxidizer, in practice is generally nontoxic and non-corrosive and is relatively inert up to temperatures of about 200° C. Further, nitrous oxide, as compared to gases such as oxygen, nitrogen, and argon, liquefies relatively easily at ambient temperatures.

Finally, nitrous oxide has the same molecular weight as carbon dioxide, which is the gas most commonly used in state of the art hybrid air bag inflators. Therefore, use of an equal amount of nitrous oxide entails no additional weight in inflation gas over conventional pure carbon dioxide inflators.

Because nitrous oxide undergoes an exothermic thermal decomposition, contained pure nitrous oxide once heated to its decomposition temperature (about 1200 degrees Fahrenheit) will undergo a rapid disassociation chain reaction unless a coolant gas is added to absorb some of the heat generated by the exothermic reaction. In the illustrative embodiment, therefore, source gas mixture 54 comprises a mixture of nitrous oxide with at least 30%–40% carbon dioxide, but preferably a mixture of from 25% to 50% nitrous oxide, with the balance of source gas mixture 54 consisting of carbon dioxide, which has a latent heat of vaporization of approximately 66 Calories per gram.

Inflator 50 includes a gas generator 56 attached to pressure vessel 52 such that the output end 58 of gas generator 56 is directed into the interior 60 of pressure vessel 52. Gas generator 56 comprises a housing 62 containing a conventional electric squib intiator and ignition charge (not shown) for starting the combustion of a solid pyrotechnic gas generating material 64. Pyrotechnic gas generating material 64 is preferably UPCO 8043, which is an ammonium nitrate based propellant available from Universal Propulsion Company in Phoenix, Ariz. UPCO 8043 has the advantages of producing a high volume of gaseous combustion products with little or no particulate combustion products and it will not conflagrate at pressures below about 1,000 psi. Consequently it is safe to manufacture and use in many applications. Gas generator 56 optionally contains an inert gas, such as nitrogen or argon to maintain the pyrotechnic gas generating material 64 under pressure within gas generator 56. Output end 58 of gas generator 56 is sealed from the interior 60 of pressure vessel 52 by a burst disk 66 welded to output end 58 of housing 62.

The output end 68 of inflator 50 is attached to a regulator valve 70 that is disposed in the gas flow path from inflator 50 to inflation hose 72. Regulator valve 70 is electrically actuated by a signal from a controller (not shown) via control wire 74 to allow gas to flow from inflator 50 into inflation hose 72 independent of (i.e. before, after or simultaneous with) the initiation of gas generator 56. The valve portion of regulator valve 70 may be a conventional spool or slide valve, but is preferably a rotating ball valve. The regulator portion of regulator valve 70 provides a regulated flow of gas to optimize the performance of aspirators 84 (shown in FIG. 3) and is of conventional construction.

Because of the premium on size generally placed on aircraft payload volume, source gas mixture 54 is preferably stored primarily in a liquid state comprising from 80–98%, and most preferably from 85%–95% of the contents of pressure vessel 52 by weight. Source gas mixture 54 is maintained in a liquid state at a pressure of from 1,000 psi. to 4,000 psi depending on the ambient temperature of from −65 to +165 degrees Fahrenheit and is maintained under pressure by an inert pressurizing gas such as helium, argon, or nitrogen. The inert pressurizing gas is especially important to maintain the minimum pressure of 1,000 psi. at −65 degrees Fahrenheit, a temperature at which the vapor pressure of nitrous oxide and carbon dioxide are well below 1,000 psi and therefore, by themselves could not maintain the pressure.

FIG. 3 is a schematic of the gas flow path of an inflation system in accordance with the present invention. As can be seen from FIG. 3, the gas flow path leads from inflator 50, through regulator valve 70, to inflation hose 72, and optionally through bulkhead fitting 76 to secondary inflation hose 78, which leads to aspirator 84 and finally to evacuation slide 12. As compressed gas flows through inlet 86 of aspirator 84 the venturi of aspirator 84 produces a low pressure area that causes the aspirator to ingest about four times as much gas as is supplied by the inflator alone. This ingestion of air continues until the back pressure in aspirator outlet 88 exceeds a threshold pressure, indicating that evacuation slide 12 is nearing full inflation, at which time the aspirator check valve or flapper doors close to prevent loss of inflation gas through the aspirator. Aspirators suitable use in the present invention include that disclosed in U.S. Pat. No. 4,368,009 to Heimovics, et al. the specification of which is incorporated herein by reference to the extent necessary to supplement this disclosure. Optionally, inflation hose 72 includes a "Y" fitting (not shown) and an additional line leading to a plurality of ball locks used to release a hatch to deploy evacuation slide 12 from its storage compartment In operation, such as upon sensing the opening of an aircraft emergency evacuation door in the armed condition, an electrical signal is sent to the gas generator 56. The gas generator 56 functions and initiates combustion of the gas generating material 64. When the pressure within gas generator 56 reaches a predetermined level, burst disk 66 ruptures allowing the heated combustion products form gas generator 56 to flow into the interior 60 of pressure vessel 52. The heated combustion products heat the interior 60 of pressure vessel 52 to a temperature above the decomposition temperature for the stored nitrous oxide (about 1200° F./650° C.) which boils a portion of the liquid source gas mixture 54 and simultaneously causes the thermal decomposition of the nitrous oxide in the source gas mixture 54. Because the thermal disassociation of nitrous oxide is also exothermic the associated release of energy assists in maintaining the heat in input to the interior 60 of pressure vessel 52 to continue the boiling of the liquid source gas mixture 54. The use of the combined mixture of nitrous oxide and carbon dioxide controls the reaction rate of the decomposition of the nitrous oxide to maintain acceptable temperatures of the gas exiting pressure vessel 52 through the output end 68 into the control valve 70.

As noted herein before, the thermal decomposition of nitrous oxide results in a 1.5:1 increase in the gas available for inflating the inflatable devices (2 moles of nitrous oxide being decomposed into a total of 3 moles of nitrogen and oxygen). Thus, an inflator in accordance with the present invention provides high inflation capacity with a minimum amount of weight and volume of stored gas. Additionally, because the thermal decomposition of nitrous oxide is an exothermic reaction, an evacuation slide system in accordance with the present invention can utilize a smaller and lighter gas generator 56 than would otherwise be required to vaporize a pure carbon dioxide liquid source gas.

What is claimed is:

1. An aircraft emergency slide system comprising:
    an inflatable evacuation slide adapted to extend from an elevated aircraft exit to a ground level; and
    an inflator coupled to said inflatable evacuation slide, said inflator comprising
        a pressure vessel;
        a source gas mixture stored in said pressure vessel, said source gas mixture comprising a diluent gas and at least one gas compound that is capable of undergoing an exothermic thermal decomposition to form decomposition products wherein the number of moles of decomposition products is greater than the number of moles of gas compound that are decomposed
        a pressurizing gas in said pressure vessel for maintaining said source gas mixture in at least a partially liquified state during storage; and
        a pyrotechnic gas generator having a hot gas output directed into said pressure vessel for heating and decomposing at least a portion of said gas compound.

2. The aircraft emergency slide system of claim 1, further comprising:
    an externally actuated, normally closed valve disposed in a fluid path between said pressure vessel and said inflatable evacuation slide, said normally closed valve operable in a closed position to block a flow of gas from said pressure vessel to said inflatable evacuation slide and operable in an open position to permit a flow of gas from said pressure vessel to said inflatable evacuation slide.

3. The aircraft emergency slide system of claim 1, further comprising:
    at least one aspirator disposed in a fluid path between said pressure vessel and said inflatable evacuation slide.

4. The aircraft emergency slide system of claim 1, wherein:
    said diluent gas comprises a gas having a latent heat of vaporization of at least 66 calories per gram.

5. The aircraft emergency slide system of claim 1, wherein:
    said diluent gas comprises Carbon Dioxide and said gas compound comprises Nitrous Oxide.

6. The aircraft emergency slide system of claim 1, wherein:
    said source gas mixture comprises a mixture of from 25%–50% Nitrous Oxide with the balance of said source gas mixture comprising Carbon Dioxide as said diluent gas.

7. The aircraft emergency slide system of claim 1, wherein:
    said source gas mixture is maintained in a liquid state comprising 85%–90% of the contents of said pressure vessel by weight.

8. The aircraft emergency slide system of claim 1, wherein:
    said pressurizing gas comprises a gas selected from the group consisting of Helium, Argon, Nitrogen and combinations of Helium, Argon and Nitrogen.

9. The aircraft emergency slide system of claim 1, wherein:
    said source gas mixture is maintained in at least a partially liquified state at a pressure of between 1,000 psi. and 4,000 psi.

10. An apparatus for inflating an aircraft emergency slide comprising:
    a pressure vessel;
    a source gas mixture stored in said pressure vessel, said source gas mixture comprising a diluent gas and at least one gas compound that is capable of undergoing an exothermic thermal decomposition to form decomposition products wherein the number of moles of decomposition products is greater than the number of moles of gas compound that are decomposed
    a pressurizing gas in said pressure vessel for maintaining said source gas mixture in at least a partially liquified state during storage;

a pyrotechnic gas generator having a hot gas output directed into said pressure vessel for heating and decomposing at least a portion of said gas compound; and an externally actuated, normally closed valve disposed in a fluid path between said pressure vessel and said aircraft emergency slide, said normally closed valve being moveable between an open and a closed position, said normally closed valve further being operable in a closed position to block a flow of gas from said pressure vessel to said aircraft emergency slide and operable in an open position to permit a flow of gas from said pressure vessel to said aircraft emergency slide.

11. The apparatus of claim 10, wherein:

said diluent gas comprises a gas having a latent heat of vaporization of at least 66 calories per gram.

12. The apparatus of claim 10, wherein:

said diluent gas comprises Carbon Dioxide and said gas compound comprises Nitrous Oxide.

13. The apparatus of claim 10, wherein:

said source gas mixture comprises a mixture of from 25%–50% Nitrous Oxide with the balance of said source gas mixture comprising Carbon Dioxide as said diluent gas.

14. The apparatus of claim 10, wherein:

said source gas mixture is maintained in a liquid state comprising 85%–90% of the contents of said pressure vessel by weight.

15. The apparatus of claim 10, wherein:

said pressurizing gas comprises a gas selected from the group consisting of Helium, Argon, Nitrogen and combinations of Helium, Argon and Nitrogen.

16. The apparatus of claim 10, wherein:

said source gas mixture is maintained in at least a partially liquified state at a pressure of between 1,000 psi. and 4,000 psi.

17. An aircraft emergency slide system comprising:

an inflatable evacuation slide adapted to extend from an elevated aircraft exit to a ground level;

an inflator coupled to said inflatable evacuation slide; and at least one aspirator disposed in a fluid path between said inflator and said inflatable evacuation slide, said inflator comprising a pressure vessel;

a source gas mixture stored in said pressure vessel, said source gas mixture comprising from 25% to 50% by weight of a gas compound that is capable of undergoing an exothermic thermal decomposition to form decomposition products wherein the number of moles of decomposition products is greater than the number of moles of gas compound that are decomposed, with the balance of said source gas mixture comprising Carbon Dioxide;

a pressurizing gas selected from the group consisting of Helium, Argon, Nitrogen and combinations of Helium, Argon and Nitrogen disposed in said pressure vessel at a pressure of between 1,000 psi. and 4,000 psi. for maintaining said source gas mixture in at least a partially liquified state during storage; and a pyrotechnic gas generator having a hot gas output directed into said pressure vessel for heating and decomposing at least a portion of said gas compound.

18. The aircraft emergency slide system of claim 17, further comprising:

an externally actuated, normally closed valve disposed in a fluid path between said pressure vessel and said inflatable evacuation slide, said normally closed valve being moveable between an open and a closed position, said normally closed valve further being operable in a closed position to block a flow of gas from said pressure vessel to said inflatable evacuation slide and operable in an open position to permit a flow of gas from said pressure vessel to said inflatable evacuation slide.

* * * * *